(12) United States Patent
Foxlin

(10) Patent No.: US 9,766,075 B2
(45) Date of Patent: Sep. 19, 2017

(54) REGISTRATION FOR VEHICULAR AUGMENTED REALITY USING AUTO-HARMONIZATION

(71) Applicant: THALES VISIONIX, INC., Clarksburg, MD (US)

(72) Inventor: Eric Foxlin, Lexington, MA (US)

(73) Assignee: THALES VISIONIX, INC., Clarksburg, MD (US)

( * ) Notice: Subject to any disclaimer, the term of this patent is extended or adjusted under 35 U.S.C. 154(b) by 0 days.

(21) Appl. No.: 14/702,402

(22) Filed: May 1, 2015

(65) Prior Publication Data

US 2015/0317838 A1    Nov. 5, 2015

Related U.S. Application Data

(60) Provisional application No. 61/988,106, filed on May 2, 2014.

(51) Int. Cl.
| | | |
|---|---|---|
| G09G 5/12 | (2006.01) | |
| G01C 21/16 | (2006.01) | |
| G06T 19/00 | (2011.01) | |
| G02B 27/06 | (2006.01) | |
| G02B 27/00 | (2006.01) | |
| G02B 27/01 | (2006.01) | |

(52) U.S. Cl.
CPC ....... *G01C 21/165* (2013.01); *G02B 27/0093* (2013.01); *G02B 27/06* (2013.01); *G06T 19/006* (2013.01); *G02B 2027/0187* (2013.01)

(58) Field of Classification Search
CPC .................................................. G02B 27/0093
USPC .......................................................... 345/633
See application file for complete search history.

(56) References Cited

U.S. PATENT DOCUMENTS

| | | | | |
|---|---|---|---|---|
| 7,640,106 | B1* | 12/2009 | Stokar | G01C 21/16 342/147 |
| 8,295,547 | B1* | 10/2012 | Cangiani | G06T 7/2046 342/357.21 |
| 2002/0194914 | A1* | 12/2002 | Foxlin | A61B 5/1114 73/514.01 |
| 2005/0251328 | A1* | 11/2005 | Merwe | G01S 19/49 701/472 |
| 2007/0081695 | A1* | 4/2007 | Foxlin | G06T 7/0042 382/103 |
| 2010/0211316 | A1* | 8/2010 | Da Silva | G01S 19/47 701/472 |

\* cited by examiner

*Primary Examiner* — Javid A Amini
(74) *Attorney, Agent, or Firm* — Arent Fox LLP

(57) ABSTRACT

A method, a system, and a computer program product for tracking an object moving relative to a moving platform, the moving platform moving relative to an external frame of reference. The system includes An inertial sensor for tracking the object relative to the external reference frame, a non-inertial sensor for tracking the object relative to the moving platform, and a processor to perform sensor fusion of the inertial and non-inertial measurements in order to accurately track the object and concurrently estimate the misalignment of the non-inertial sensor's reference frame relative to the moving platform.

27 Claims, 12 Drawing Sheets

REGISTRATION FOR VEHICULAR AUGMENTED REALITY USING AUTO-HARMONIZATION

CROSS-REFERENCE TO RELATED APPLICATION

This application claims the benefit of U.S. Provisional Application Ser. No. 61/988,106, entitled "Improved Registration for Vehicular Augmented Reality Using Auto-Harmonization" and filed on May 2, 2014, which is expressly incorporated by reference herein in its entirety.

BACKGROUND

Field

The present disclosure relates generally to motion tracking, and more particularly, to a method, system, and computer program product for motion tracking in connection with augmented reality systems, e.g., including a head mounted display (HMD).

Background

Recently there has been an explosion of interest in Augmented Reality well beyond the research community where the field was forged in the early years of the ISMAR conference and its prequels. The popular press has adopted wholesale the vision of the pioneering researchers, in which augmented reality (AR) will become an indispensable tool to augment human performance by providing enhanced situational awareness and visual guidance to complete tasks quickly and accurately without advance training.

For the past several years it seemed that the early focus on HMD-based AR had largely given way to tablet and phone AR because the devices became widely available to consumers and advertisers saw the novelty of simple video AR as a way to reach them. Wearable AR systems leave the user's hands free and can provide an always-on information display that is ready to provide augmentations quickly when they are needed.

This renewed interest in HMDs still faces challenges including optical technologies to produce small comfortable HMDs with sufficient field of view (FOV), and head-tracking that can produce convincing spatio-temporal registration of augmentations to their corresponding physical objects in unprepared real-world environments. Additional details can be found in Azuma, R., and Bishop, G., "Improving Static and Dynamic Registration in a See-Through HMD", Proceedings of SIGGRAPH 37 '94. In Computer Graphics, Annual Conference Series, Orlando, Fla., pp. 197-204, 1994; Krevelen, D. W. F., & Poelman, R. A Survey of Augmented Reality Technologies, Applications and Limitations. *The International Journal of Virtual Reality*, 9(2): 1-20, 2010; Daniel Wagner, Gerhard Reitmayr, Alessandro Mulloni, Tom Drummond, Dieter Schmalstieg. Pose tracking from natural features on mobile phones. *Proceedings of the 7th IEEE/ACM International Symposium on Mixed and Augmented Reality*, pages 125-134. ISMAR 2008; Welch, G., Bishop, G., Vicci, L., Brumback, S., Keller, K. & Colluci, D. (2001). High-Performance Wide-Area Optical Tracking: The HiBall Tracking System. Presence: Teleoperators and Virtual Environments vol 10, issue 1, MIT Press; and Zhou, F., Been-Lirn Duh, Henry., Billinghurst, M. Trends in augmented reality tracking, interaction and display: A review of ten years of ISMAR. *Proceedings of the 7th IEEE/ACM International Symposium on Mixed and Augmented Reality*, Pages 193-202. ISMAR 2008; and Roberts, D., Menozzi, A., Cook, J., Sherrill, T., Snarski, S., Russler, P., . . . & Welch, G. Testing and evaluation of a wearable augmented reality system for natural outdoor environments. In SPIE defense, Security, and Sensing (pp. 87350A-87350A). International Society for Optics and Photonics. May 2013, the entire contents of each of which are incorporated herein by reference.

The ability to operate without markers has been demonstrated in many indoor and outdoor environments at impressive scale, and for video-see-through AR (such as tablets and phones) vision-based techniques also produce rock-solid registration with no noticeable swim or mis-registration. However optical see-through registration is a much harder problem because the view of the physical world cannot be delayed to match the view of the virtual augmentations, and the alignment cannot be simply matched up in a video image, which puts a much greater demand on absolute 6-DOF pose accuracy and relative calibration accuracy of the tracker to the display.

Thus, there remains need in the art for methods of achieving registration that appears "rock solid" with no noticeable "swim."

SUMMARY

In light of the above described problems and unmet needs, aspects of the design, development and testing of an augmented reality (AR) system are presented herein. These aspects may be used, e.g., for aerospace and ground vehicles in order to meet stringent accuracy and robustness requirements. A system is presented that achieves an unprecedented spatio-temporal registration for a see-through HMD. Additional aspects include a system architecture, motion-tracking algorithms, and harmonization techniques for implementing a precision AR system in a moving vehicle Aspects may include a system using an optical see-through HMD, which requires extremely low latency, high tracking accuracy and precision alignment, and calibration of all subsystems in order to avoid mis-registration and "swim". Aspects include an optical/inertial hybrid tracking system and novel solutions to the challenges associated with the optics, algorithms, synchronization, and alignment between a moving vehicle and such HMD systems. A system accuracy analysis is presented with simulation results to predict the registration accuracy.

Additional advantages and novel features of these aspects will be set forth in part in the description that follows, and in part will become more apparent to those skilled in the art upon examination of the following or upon learning by practice of the invention.

BRIEF DESCRIPTION OF THE DRAWINGS

Various example aspects of the systems and methods will be described in detail, with reference to the following figures, wherein.

DETAILED DESCRIPTION

Figure 1:
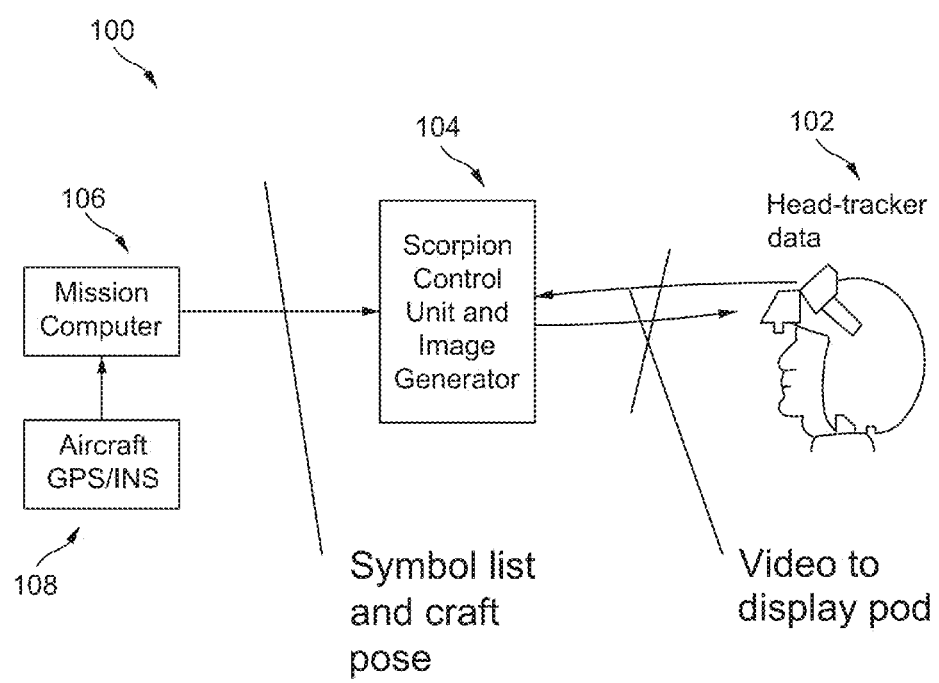
FIG. 1 is a diagram illustrating an example of an overall vehicular augmented reality system for use in accordance with aspects of the present invention.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of motion tracking systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

This application contains various features that relate to U.S. Pat. No. 6,474,159, titled "Motion Tracking," which issued on Nov. 5, 2002, the entire contents of which are incorporated herein by reference.

There are compelling applications for AR in various kinds of aircraft and ground vehicles as well. In fact, the very earliest head-tracked see-through HMDs were used on aircraft decades before the term "AR" was coined. Additional details are described in Furness, T. A. (1986). The Super Cockpit and Human Factors Challenges. In Ung, M. *Proceedings of Human Factors Society* 30*th Annual Meeting*, pp. 48-52, the entire contents of which are incorporated herein by reference. Vision-based tracking on vehicles presents very different challenges than for normal ground-based AR. The immediate visual surroundings are the interior of the vehicle, where use of markers may be perfectly practical. However, these markers (or any other visual features in the vehicle) are moving relative to the world frame where augmentations need to be stabilized, thus requiring careful engineering to track the vehicle, and the head relative to the vehicle, and combine it all with sufficient accuracy to achieve.

A variety of head-trackers that were in use on airplanes prior to 1991, e.g., which were mostly mechanical, optical and magnetic, are described in F. Ferrin, "Survey of helmet tracking technologies", SPIE, vol. 1456, pp 86-94, 1991, the entire contents of which are incorporated herein by reference. A hybrid inertial helmet tracker for aircraft is described in Foxlin, E. Head-tracking relative to a moving vehicle or simulator platform using differential inertial sensors. *Proceedings of Helmet and Head-Mounted Displays V*, SPIE Vol. 4021, AeroSense Symposium, Orlando, Fla., Apr. 24-25, 2000, the entire contents of which are incorporated herein by reference. An additional aspects, including inside-outside-in optical are described in Foxlin, E., Altshuler, Y., Naimark, L., & Harrington, M. FlightTracker: A Novel Optical/Inertial Tracker for Cockpit Enhanced Vision. *IEEE/ACM International Symposium on Mixed and Augmented Reality* (Washington, D.C., ISMAR 2004), Nov. 2-5, 2004; Foxlin, E. & Naimark, L. (2003). VIS-Tracker: A Wearable Vision-Inertial Self-Tracker. *IEEE Conference on Virtual Reality* (Los Angeles, Calif., 2003); and Atac, R. & Foxlin, E. Scorpion hybrid optical-based inertial tracker (HObIT). Proc. SPIE 8735, *Head- and Helmet-Mounted Displays*

*XVIII: Design and Applications*, 873502, May 16, 2013, the entire contents of which are incorporated herein by reference.

Aspects of the system and method presented herein are compatible with various vehicles, including both military and civilian aircraft. In order to be compatible with, e.g., different mission computers (MC) that may already be present in aircraft, a display system in accordance with aspects of the present invention may implement only the generic head-tracking, rendering and display functions that are common to all vehicular AR systems, and none of the mission-specific functions such as targeting, cueing, enhanced vision or synthetic vision. As such a system would be responsible for rendering, but doesn't decide what is to be rendered, the interface to the MC allows the MC to define and download an arbitrary set of "symbols" including any 2D or 3D shapes involving line segments of any color or thickness and/or bitmaps. Each symbol may be specified by the MC to be ground-stabilized or head-stabilized or vehicle-stabilized.

FIG. 1 is an overall system diagram of an example AR system 100 for use in accordance with aspects of the present invention. The example system of FIG. 1 includes a HMD 102 that includes a tracking component and a display. A control unit and image generator 104 receives tracking data relating to the HMD and communicates a generated image to the HMD. Control unit 104 also receives input from a vehicle's mission computer 106, including, e.g., symbol data and data from an aircraft GPS/INS 108.

Aspects presented herein may include replacing a magnetic tracker so that the system involves no cockpit-installed active devices (such as a magnetic source or optical cameras). Instead, all the inertial and optical sensors may be provided in a self-contained sensor mounted, e.g., on the helmet. The sensor may communicate with a control unit, such as a cockpit mounted control unit, through a Helmet-Vehicle Interface (HVI). The sensor may communicate with the control unit, e.g., using the same HVI cable as the display pod. Fiducial stickers may be placed on the canopy over the pilot or driver's head to assist in the motion tracking.

Optics and Image Processing

Optics for aircraft applications may require a very wide field fisheye lens, e.g., because the camera is only about 5-10 cm from the aircraft canopy. Good clear imaging may be required at close range, e.g., throughout a 140 FOV. Because the camera faces in the direction of the aircraft canopy, the sun can be directly in the FOV of the camera, which makes for some very difficult dynamic range problems. In order to address the potential challenges caused by the camera being directed toward the canopy, fiducials may be used that get brighter proportionally when backlit by the sun. In order to use such fiducials at night an illuminator may be added.

As an additional option, retro-reflective stickers may be used for the fiducials on the canopy in order to overcome the inverse square loss from diffuse fiducials and return as much of the illumination to the lens as possible. With such a fiducial design, the fiducials can be illuminated with NVG-compatible wavelengths in order to obtain a high read rate throughout most of the 140 degree FOV.

Figure 2:
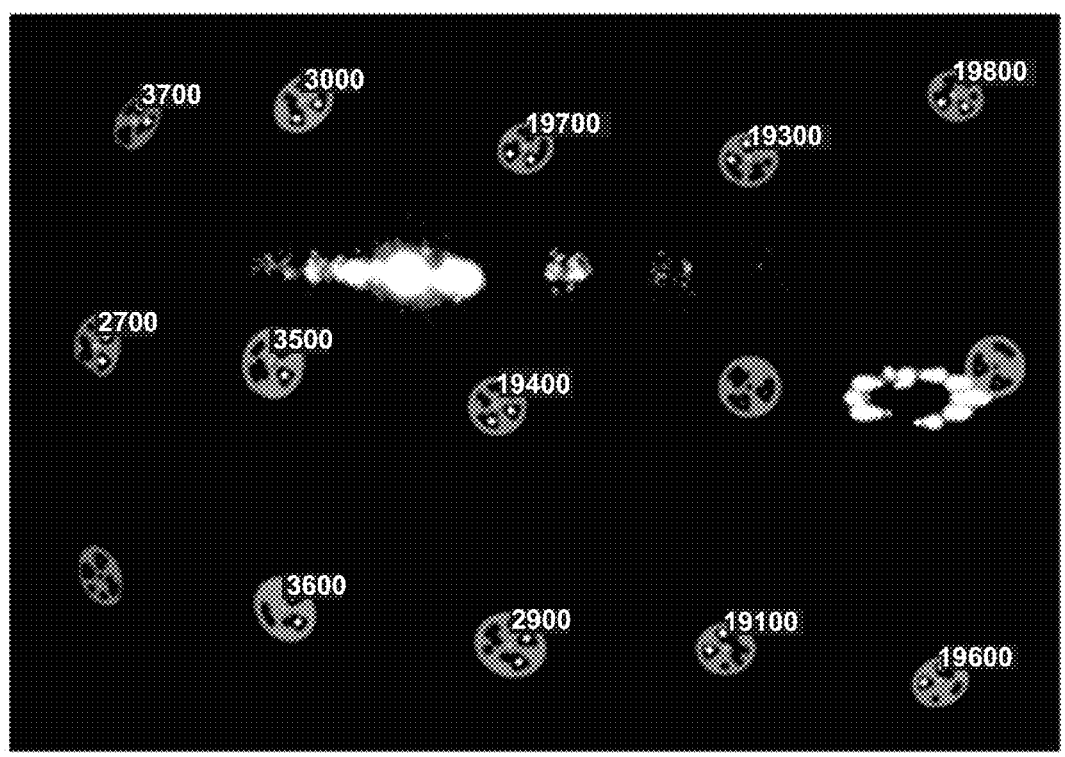
FIG. 2 illustrates an example image of fiducials having the sun directly behind them, for use in accordance with aspects of the present invention.
Figure 3:
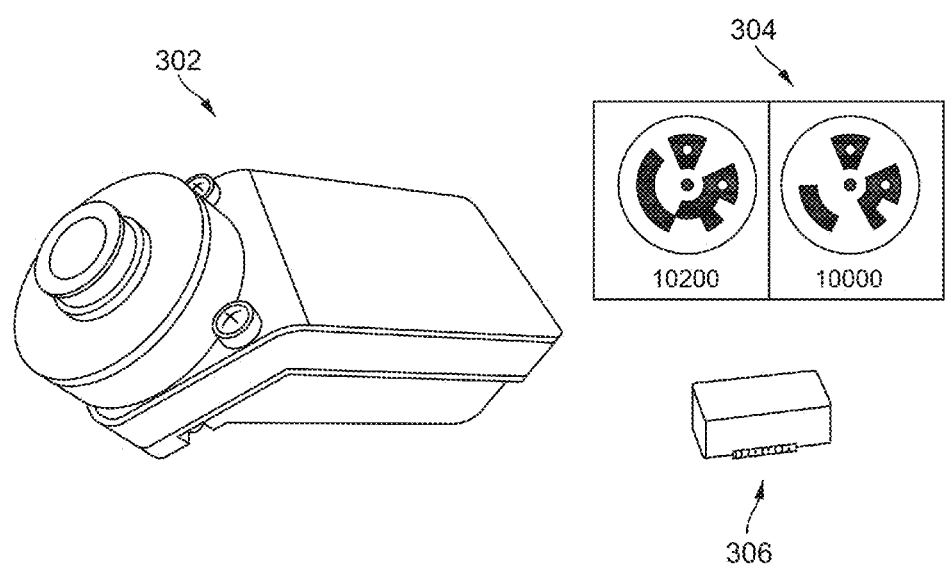
FIG. 3 illustrates example tracking components, in accordance with aspects of the present invention

In order to further address the problem of fiducial readability in direct sunlight, a tight bandpass filter may be installed behind the lens. As another option the exposure may be lowered from a lowest usable setting of 1 millisecond to well below 50 microseconds in order to reject a satisfactory amount of sunlight. This may provide both sunlight readability and NVG-compatibility with a unique illuminator design. FIG. 2 illustrates an example image 200 of fiducials having the sun directly behind them, for use in accordance with aspects of the present invention. FIG. 3 illustrates example tracking components including a tracker 302 that may be mounted to a helmet, fiducial markers 304, and an inertial measurement unit (IMU) 306 that may be included in the tracker 302, in accordance with aspects of the present invention. By illuminating retro-reflective targets directly, the problems caused by ambient lighting such as shadows or sub-optimal exposures can be avoided.

Figure 4:
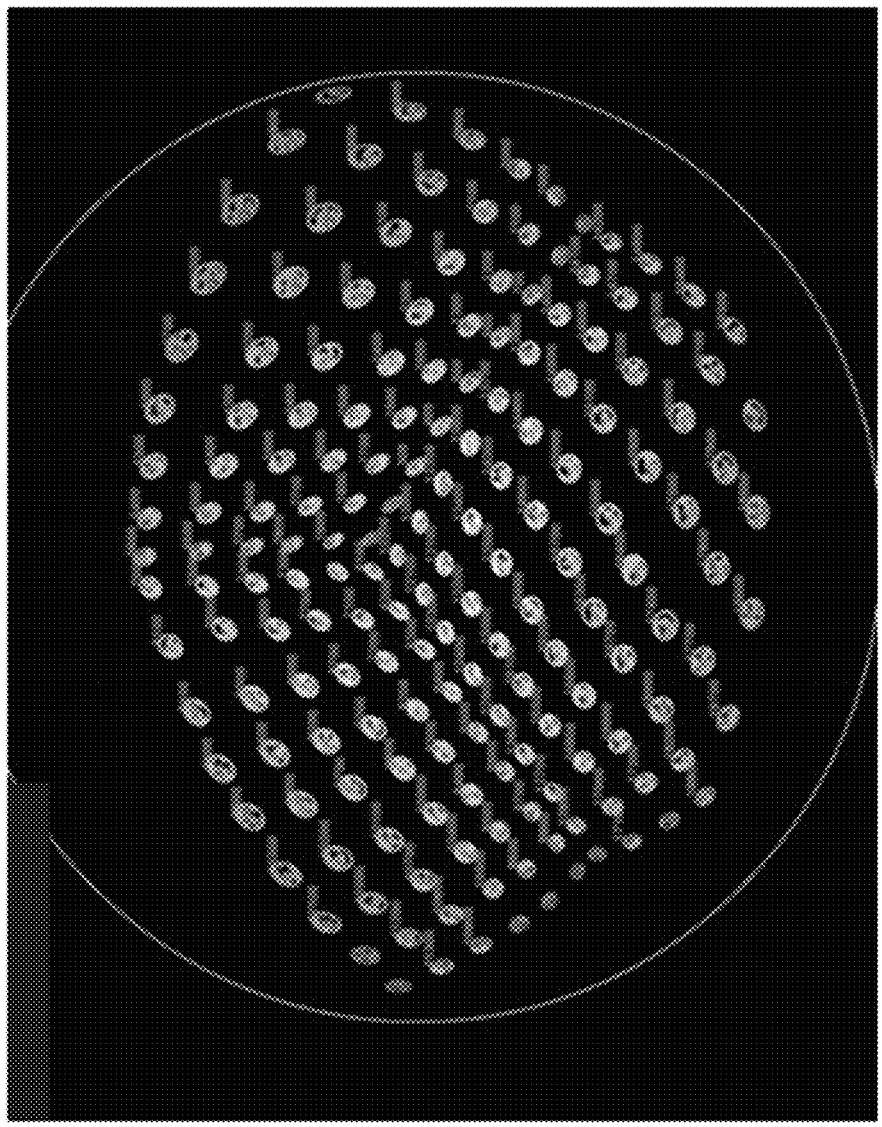
FIG. 4 illustrates an example image captured through the tracking camera contained within tracking sensor assembly 302 that shows a clean separation of retro-reflector fiducials, in accordance with aspects of the present invention.

FIG. 4 illustrates an example image 400 captured through an HMD camera that shows a clean separation of retro-reflector fiducials from background and high fiducial read rate, in accordance with aspects of the present invention.

Camera Calibration

The intrinsic distortion parameters of a fisheye lens used in the motion tracking system may be calibrated, e.g., by taking about 40 images of a 3-walled fiducial-clad calibration fixture shown in FIG. 4. The calibration may be adapted to fit an appropriate set of distortion parameters to model the lens with improved accuracy.

Figure 5:
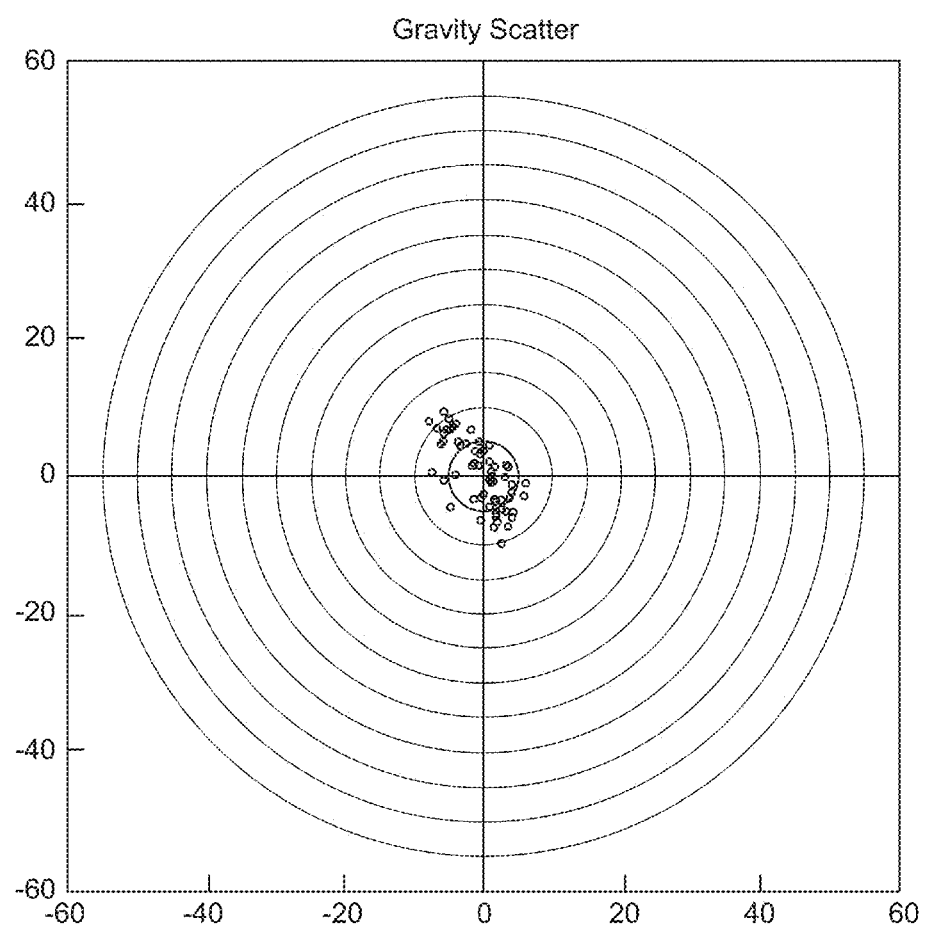
FIG. 5 illustrates a scatter plot of the world-frame gravity vectors after extrinsic parameter optimization, in accordance with aspects of the present invention.
Figure 6:
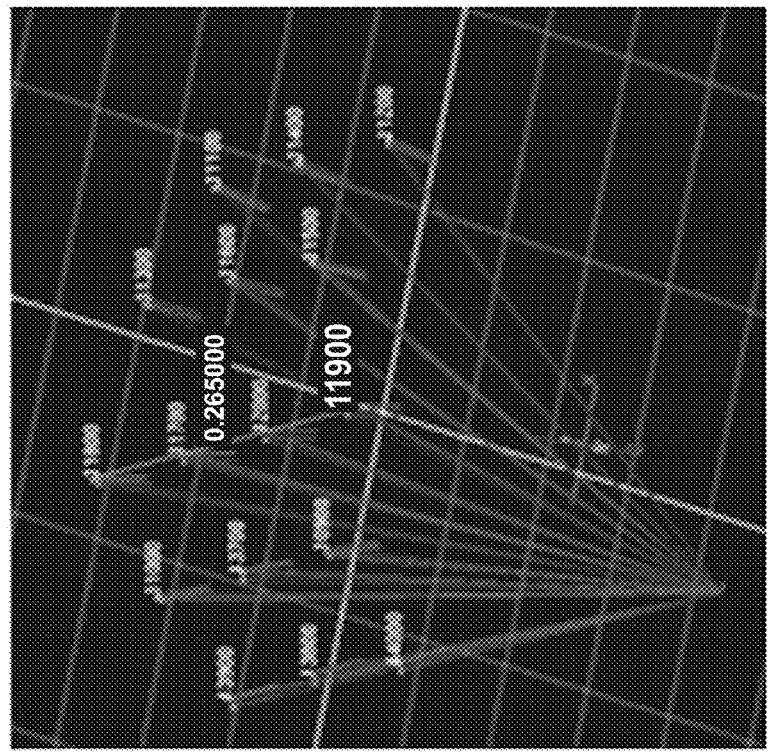
FIG. 6 illustrates screenshots from the automapping tool, in accordance with aspects of the present invention.
Figure 6:
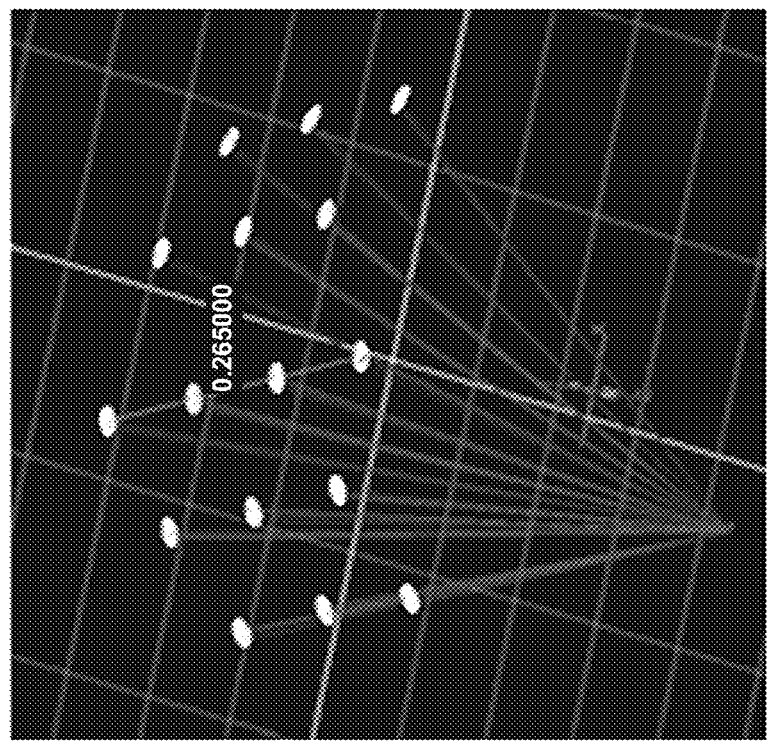

To solve the extrinsic calibration of the relative pose between the camera and the IMU, an optical pose associated with each calibration frame may be associated with a simultaneous pitch and roll measurement computed from the IMU's sensors with an altitude heading reference system (AHRS) algorithm. An optimization algorithm may be used to seek the extrinsic parameters that cause all the gravity vectors from the AHRS to align with the downward direction of the calibration stand when they are transformed from the body axes of the IMU to the camera axes by the extrinsic rotation then transformed to world frame by the camera pose rotation. FIG. 5 illustrates a scatter plot of the world-frame gravity vectors after extrinsic parameter optimization. Each circle in FIG. 5 is 5 mrad, in accordance with aspects of the present invention. FIG. 6 illustrates screenshots 602, 604 from an automapping tool. The right image 604 shows an example of the way that normal vectors can be automatically computed by finding the locations of the three "eyes" in each fiducial and calculating the cross product in accordance with aspects of the present invention.

A very robust photogrammetric 3D mapping tool may accurately map a group of fiducials in a few minutes by simply scanning the sensor over the fiducial field. The algorithm may use Nister's 5-point algorithm to create an initial reconstruction from 5 fiducials found in common between two views. Additional details regarding Nister's 5-point algorithm may be found in Nister, D, An Efficient Solution to the Five-Point Relative Pose, PAMI 2004, the entire contents of which are incorporated herein by reference. The mapping tool may then alternate between triangulation to localize additional points, pose recovery to add additional camera poses, and bundle adjustment to refine the motion and structure parameters and discard outliers. Mixed fiducial sizes may be used. The automapper may automatically scale the map when the user enters the diameter of the largest fiducial in the map. After scaling, the reported point tightness values may be, e.g., around 30-70 microns for a 30 cm grid.

Vehicle Harmonization

The final and most difficult step of installation is harmonization. In general for avionics "harmonization" is the process of aligning the axes of various aircraft systems with one another, such as the inertial navigation system (INS), the heads-up-display (HUD), the HMD tracking system reference, sensor pods or targeting pods, and weapons. Various aspects may be used to align the fiducial constellation with the aircraft axes, or more specifically with the platform INS axes since the INS is the reference frame from which symbol generators are driven. When the aircraft contains an HUD, it may be assumed that the HUD is already aligned with the p-frame of the INS. A tool containing a collimated optical scope with a sensor aligned on top may be used. By pointing the scope at the watermark in the HUD it can be aligned with the platform x-axis, and at the same time the sensor may be directed up at the fiducials in order to determine the pose of the scope relative to an n-frame, from which the rotation of the n-frame may be solved with respect to (w.r.t.) the p-frame.

When a vehicle, e.g., an aircraft or ground vehicle, lacks a HUD, physical measurements may be taken from reference points on the vehicle. However, this process is very cumbersome and time-consuming, and difficult to perform with sufficient accuracy. Thus, aspects of the system presented herein eliminate the process and greatly improve accuracy.

Tracking, Auto-Harmonization and Delay Estimation Algorithms

Figure 7:
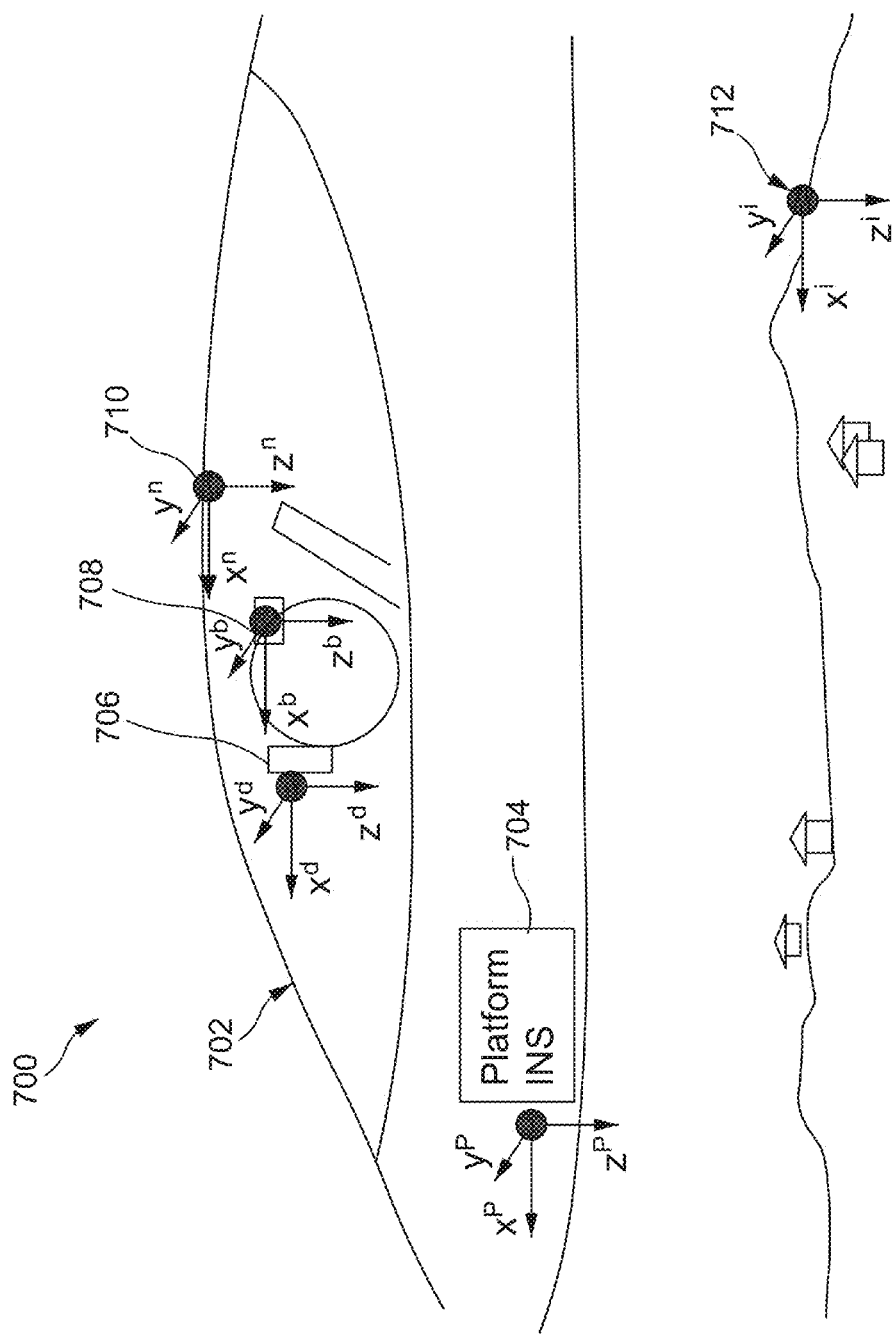
FIG. 7 illustrates an example of a fighter jet cockpit with coordinate axes associated with five different parts of the system, in accordance with aspects of the present invention.

FIG. 7 illustrates an example 700 of a fighter jet cockpit 702 with coordinate axes associated with the platform INS 704($p$), the display (d), the sensor body (b), the fiducial constellation 710($n$) and the ground 712($i$) in accordance with aspects of the present invention. Table 1 lists the five associated coordinate frames.

TABLE 1

| | |
|---|---|
| i-frame | The i-frame is an inertial reference frame, which for our purposes is a local-level North-East-Down (NED) frame on the ground below the aircraft that rotates sufficiently slowly to be considered an inertial frame. |
| p-frame | The aircraft "platform INS" frame. The "platform INS" is the inertial navigation system that supplies pose data to the mission computer (MC) and in turn to the display system. |
| n-frame | The reference frame of the tracking system. For a magnetic tracker the n-frame has its origin in and axes nominally aligned with the source coil assembly. For example, the n-frame may have its origin at one of the fiducials and its axes may be roughly aligned to the aircraft axes during ground harmonization procedures. |
| b-frame | The body frame of the tracker sensor. For example, the b-frame may be defined by the NavChip inside the sensor assembly, which is mounted upside-down, backwards and tilted relative to the helmet. |
| d-frame | Display frame defined by the lightguide optical element (LOE) or "paddle" on the display pod. |

Vectors are denoted by lowercase bold letters and matrices by uppercase bold. If a vector is expressed in a particular coordinate system it is denoted with a superscript designating one of the above five frames. A rotation matrix has a subscript and a superscript and transforms a vector from the subscript frame to the superscript frame. A hat above a quantity refers to an estimated value, a tilde above means a measured value, and the unadorned symbol represents the true value.

Basic Orientation Tracking Filter

Figure 8:
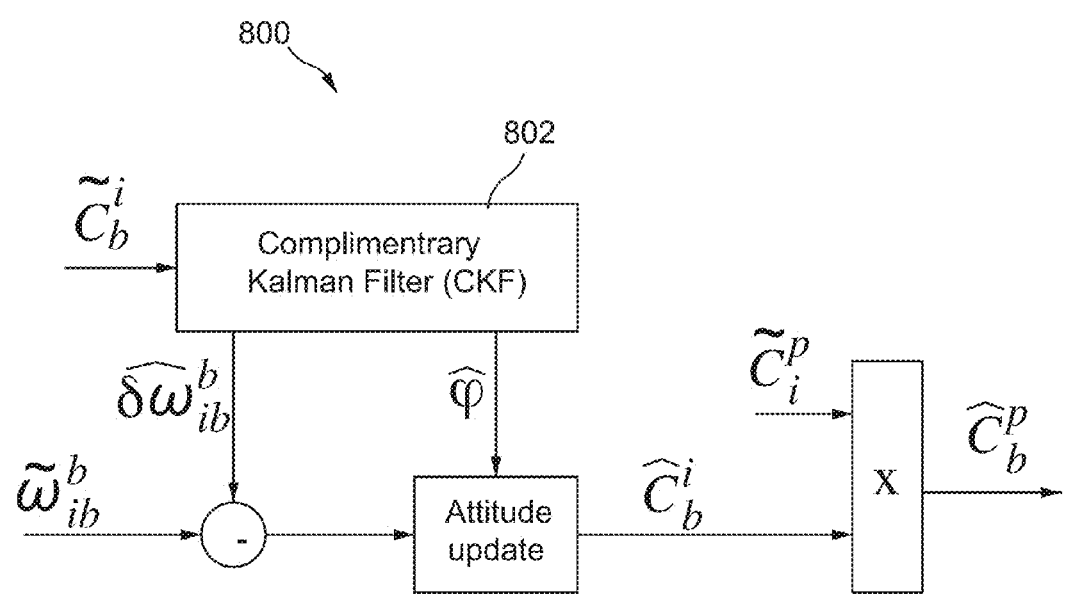
FIG. 8 illustrates an algorithm for tracking, in accordance with aspects of the present invention.

An Extended Kalman Filter (EKF) may be used in accordance with aspects presented herein. Systems using a rolling-shutter image sensor may have to process each individual fiducial measurement separately at a different point in time, using a highly nonlinear bearings-only measurement model which was a function of position as well as orientation. By using a global shutter imager and the much faster processing element (ARM Cortex A8 at 1 GHz), the sensor presented herein may be able to simultaneously capture and decode up to 20 fiducials at frame rate. For every frame, it solves for pose using a modified version of the OpenCV pose recovery algorithm, which results in a direct measurement of the rotation that can be used to correct gyro drift. Therefore, the head orientation can be tracked independently from position using just gyros and camera pose measurements and a very simple 6-state Complementary Kalman Filter (CKF) to estimate the rotation errors and gyro biases as shown in FIG. 8. FIG. 8 illustrates an algorithm 800 for tracking relative to i-frame, then converting output to p-frame for legacy tracker compatibility in accordance with aspects of the present invention.

The head-tracker gyros measure $\tilde{\omega}_{ib}^b$, the angular rates of the sensor (b-frame) relative to the ground (i-frame). Rather than use a more complicated differential inertial algorithm, the angular rates may be integrated to estimate head orientation with reference to the ground, $\hat{C}_b^i$, and the complementary filter may be used to directly correct the errors of this ground-referenced orientation as well as the gyro biases. As a final step, the result may be pre-multiplied by the inverse of the aircraft attitude supplied from the platform INS in order to provide the head-tracker orientation w.r.t. the aircraft platform axes. This may be required, e.g., by legacy mission computers that were designed for non-inertial trackers.

Because the optical subsystem measures the pose of the sensor b-frame with respect to the fiducial constellation n-frame, $\tilde{C}_b^n$, the CKF may be fed a pseudo-measurement relative to the ground formed as follows:

$$\tilde{C}_b^i = C_p^i C_n^p \tilde{C}_b^n \quad (1)$$

Here $C_p^i$ is the attitude of the vehicle returned from the platform INS, $\tilde{C}_b^n$ is the measurement of the sensor pose relative to the fiducial constellation frame, and $C_n^p$ is the alignment rotation relating the constellation reference frame to the platform INS frame, which was determined during the harmonization process described above.

The CKF 802 is simply a linear Kalman Filter that estimates the small errors that accumulate in the attitude update algorithm, together with the gyro biases that are partly responsible for creating those errors. The state vector is $\delta x = [\phi^T \; \delta \omega^T]^T$ where the small-angle rotation error vector $\phi$ is defined by $$\hat{C}_b^i = (I - [\phi \times]) C_b^i \quad (2)$$

The notation $[\phi \times]$ represents the skew-symmetric matrix or cross product operator:

$$[\varphi \times] = S(\varphi) = \begin{bmatrix} 0 & -\varphi_z & \varphi_y \\ \varphi_z & 0 & -\varphi_x \\ -\varphi_y & \varphi_x & 0 \end{bmatrix} \quad (3)$$

From Titterton, D. & Weston, J. Strapdown Inertial Navigation Technology, 2nd Edition, January 2004, the entire contents of which are incorporated herein by reference. The time update equation for the CKF is $$\begin{bmatrix} \varphi \\ \delta \omega \end{bmatrix}_{k+1} = \begin{bmatrix} I & -\Delta t C_b^i \\ 0 & I \end{bmatrix} \begin{bmatrix} \varphi \\ \delta \omega \end{bmatrix}_k + w_k \quad (4)$$

To simplify the derivation of the measurement update equation, the measurement for the CKF may be defined not as the quantity $\tilde{C}_b^i$ calculated in (1), but as a residual calculated from it as follows:

$$z \triangleq S^{-1}(\tilde{C}_b^i \hat{C}_b^{i^T} - I) \quad (5)$$

Thus, an inverse skew-symmetric matrix operator is presented that extracts the corresponding vector elements from a skew-symmetric matrix. The input matrix will be very close to skew symmetric because the measurement $\tilde{C}_b^i$ is derived from a very accurate optical pose recovery combined with a very accurate (sub-milliradian) aircraft attitude from an INS, and a harmonization matrix that may be determined accurately in advance. Ignoring the small measurement error, (5) can be expanded to obtain $$z \triangleq S^{-1}\left(\tilde{C}_b^i \hat{C}_b^{iT} - I\right)$$
$$\approx S^{-1}(C_b^i C_i^b (I + [\varphi \times]) - I)$$
$$= S^{-1}([\varphi \times])$$
$$= \varphi$$

which nicely simplifies the CKF measurement update equation to $$z_k = H \delta x_k + v_k \quad (6)$$

$$H = [I\ 0].$$

Filter Augmentation for Auto-Harmonization

Errors in the harmonization alignment matrix $C_n^p$ which had been determined during installation may dominate a system error budget. While it is desirable to improve harmonization accuracy, achieving high accuracy in ground harmonization requires delicate and expensive precision surveying equipment which would be logistically difficult to maintain at all the necessary locations to service a fleet, and lengthy elaborate manual operations requiring very patient and skilled technicians. Additionally, manual measurement-based harmonization procedures can only facilitate aligning the fiducial constellation with visible features on the airplane (such as a crosshair in a HUD or a boresight reticle unit). The accuracy of the AR system however relies on the alignment of the fiducials with the platform INS which is buried in the avionics bay and cannot be directly measured. Thus, manual harmonization relies on the accuracy of some previous harmonization that should have aligned the INS with the HUD. Unfortunately in many cases the vehicle had no HUD with which to align our constellation.

Thus, in aspects, the Kalman filter may be augmented with three additional states to estimate the harmonization error angles $\psi$, which are defined analogously to the tracker error angles in (2):

$$\hat{C}_n^p = (I - [\psi \times])C_n^p \quad (7)$$

These states are constant, so the time propagation equation remains basically the same with the added states:

$$\begin{bmatrix} \varphi \\ \delta\omega \\ \psi \end{bmatrix}_{k+1} = \begin{bmatrix} I & -\Delta t C_b^i & 0 \\ 0 & I & 0 \\ 0 & 0 & I \end{bmatrix} \begin{bmatrix} \varphi \\ \delta\omega \\ \psi \end{bmatrix}_k + w_k \quad (8)$$

To get the new measurement equation, substitute the right hand side of (7) for $C_n^p$ in (1), then substitute that into (5) to get.

$$z \triangleq S^{-1}\left(\tilde{C}_b^i \hat{C}_b^{iT} - I\right) \quad (9)$$

-continued
$$= S^{-1}\left(C_p^i \hat{C}_n^p \tilde{C}_b^n \hat{C}_b^{iT} - I\right)$$
$$\approx S^{-1}(C_p^i(I - [\hat{\psi} \times])C_n^p \tilde{C}_b^n C_i^b(I + [\varphi \times]) - I)$$
$$= S^{-1}(-C_p^i[\psi \times]C_i^p + [\varphi \times])$$
$$= -C_p^i \psi + \varphi$$

The last line takes advantage of the fact that the similarity transformation to the i-frame of the p-frame cross product operator $[\psi \times]$ must be geometrically equivalent to an i-frame cross product operator using $\psi^i = C_p^i \psi$. Once again we end up with an elegantly simple CKF measurement update equation that relates the measurement residual z to both the tracker error $\varphi$ and an effectively static measurement bias $\psi$:

$$z_k = H \delta x_k + v_k \quad (10)$$

with $$H = [I\ 0\ -C_p^i]. \quad (11)$$

Because $C_p^i$ varies with the vehicle attitude, the observability Gramian becomes full rank after the vehicle takes off and begins to maneuver, so only then will both the head orientation and harmonization error covariances converge to small values.

Filter Augmentation for Compensating Delayed INS Data

If there were significant delay in the aircraft INS data between the time it is sampled in the INS and the time it reaches the tracking system, the measurement updates in the Kalman filter would receive measurement errors significantly larger than the tuned measurement noise matrix resulting in suboptimal performance. Rather than retune the filter to expect vastly more measurement noise, given the slow dynamics of an aircraft, it is possible to remove most of the error by forward predicting the aircraft attitude for a known amount of latency for which to compensate. In order to try to automatically estimate and adapt to the data latency, one additional state may be added to the CKF to estimate the error of the prediction interval currently in effect for compensating the measurement data latency.

First, a block may be added to perform forward prediction of the platform INS attitude $C_p^i$ by a rotation angle of $\omega_{ip}^p \Delta t$ where platform angular velocity $\omega_{ip}^p$ is estimated from the last two samples of platform attitude, and $\Delta t$ is initialized to 50 ms with an uncertainty of 100 ms. Finally we replace $C_i^p$ in the measurement equation with $$\hat{C}_i^p = (I - \tau[\omega_{ip}^p \times])C_i^p \quad (12)$$

which results in our final 10-state measurement model $$H = [I\ 0\ -C_p^i\ C_p^i \omega_{ip}^p]. \quad (13)$$

Potential Applications

In addition to aircraft, there are a number of potential applications for the motion tracking aspects presented herein. For example, AR applications in ground vehicles. In climates like Alaska that receive large amounts of snow, the snow piles may become so high that drivers of snow ploughs cannot see the tops of the roadside guidance poles. In this circumstance, an AR system can be used to guide the plow drivers.

Another possibility is AR guidance for operators of earth-moving equipment and other heavy construction machinery in order to help them more efficiently and exactly achieve the desired results planned in a CAD model. AR headsets would also be valuable to provide situational awareness to first responders while they drive to the scene, and after they dismount from the vehicles at the scene.

The novel auto-harmonization algorithm presented herein makes it possible to consider motion tracking on these types of vehicles, which are not equipped with a HUD to facilitate traditional methods of harmonization. Although many of these vehicles do not currently have installed GPS/INS systems, with the recent developments in the MEMS field, the cost of sufficient performance is falling very rapidly and it may already be practical to add a MEMS GPS/INS unit as part of the vehicular AR package.

Figure 9:
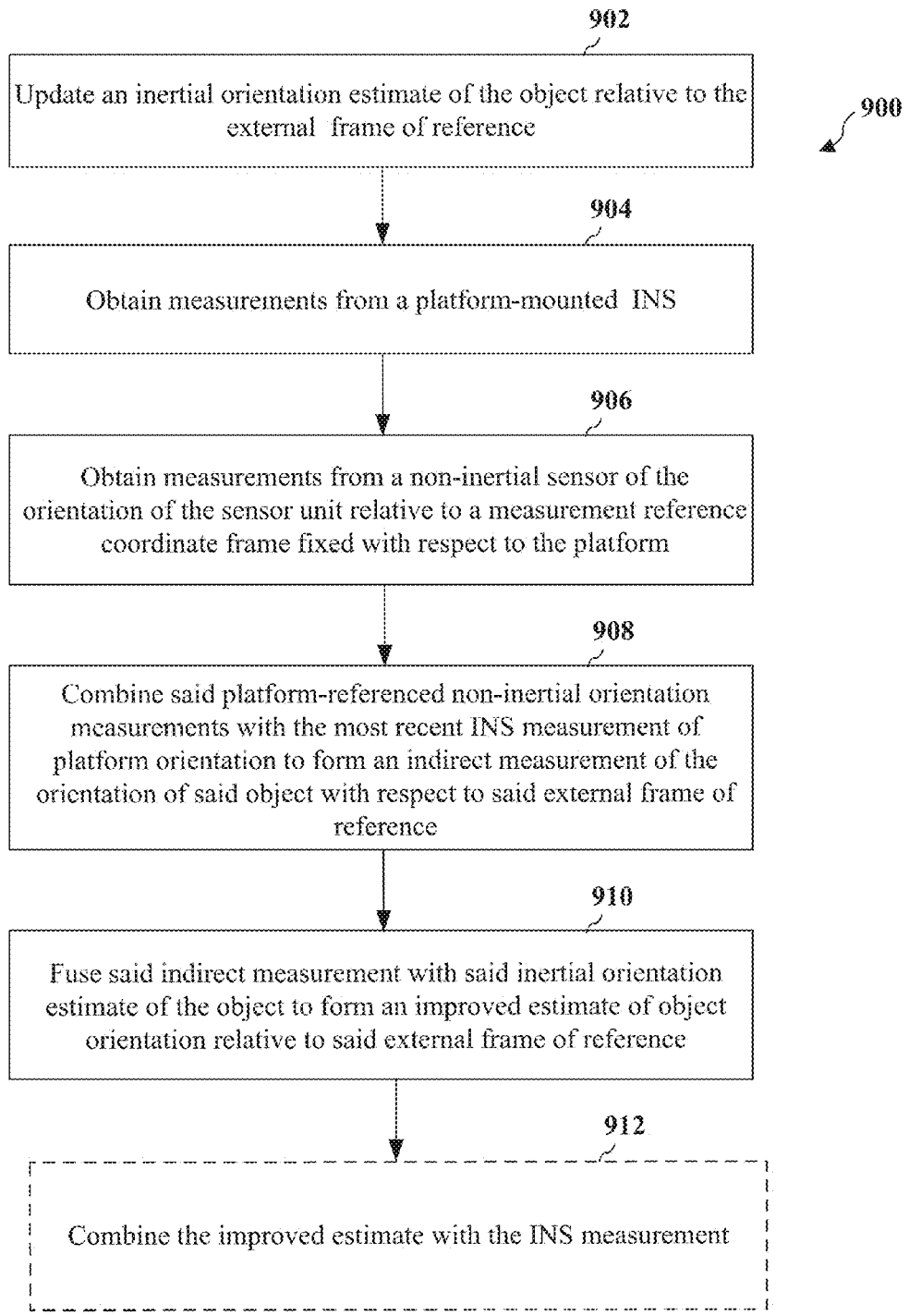
FIG. 9 is a flow chart of an example method of tracking an object moving relative to a moving platform, in accordance with aspects of the present invention.

FIG. 9 illustrates an example method 900 for tracking an object moving relative to a moving platform, the moving platform moving relative to an external frame of reference, in accordance with aspects of the present invention.

At 902, an inertial orientation estimate of the object relative to the external frame of reference is updated using at least one angular rate sensor comprised in a sensor unit fixed to the object. The external frame of reference may be, e.g., a world frame that does not rotate with said moving object. Thus, object may be, e.g., a HMD that moves relative to a moving vehicle, such as an airplane. Likewise, the airplane moves relative to an external frame of reference, such as a world frame of reference.

The angular rate sensors may be, e.g., gyroscopes.

At 904, measurements are obtained from a platform-mounted INS of the orientation of a platform coordinate frame with respect to said external frame of reference. In certain aspects, the measurements may be obtained from the platform-mounted INS at a lower rate than the sensor unit fixed to the object.

Then, 906, 908, and 910 are performed at certain measurement times. At 906, measurements are obtained from a non-inertial sensor of the orientation of the sensor unit relative to a measurement reference coordinate frame fixed with respect to the platform.

Figure 10:
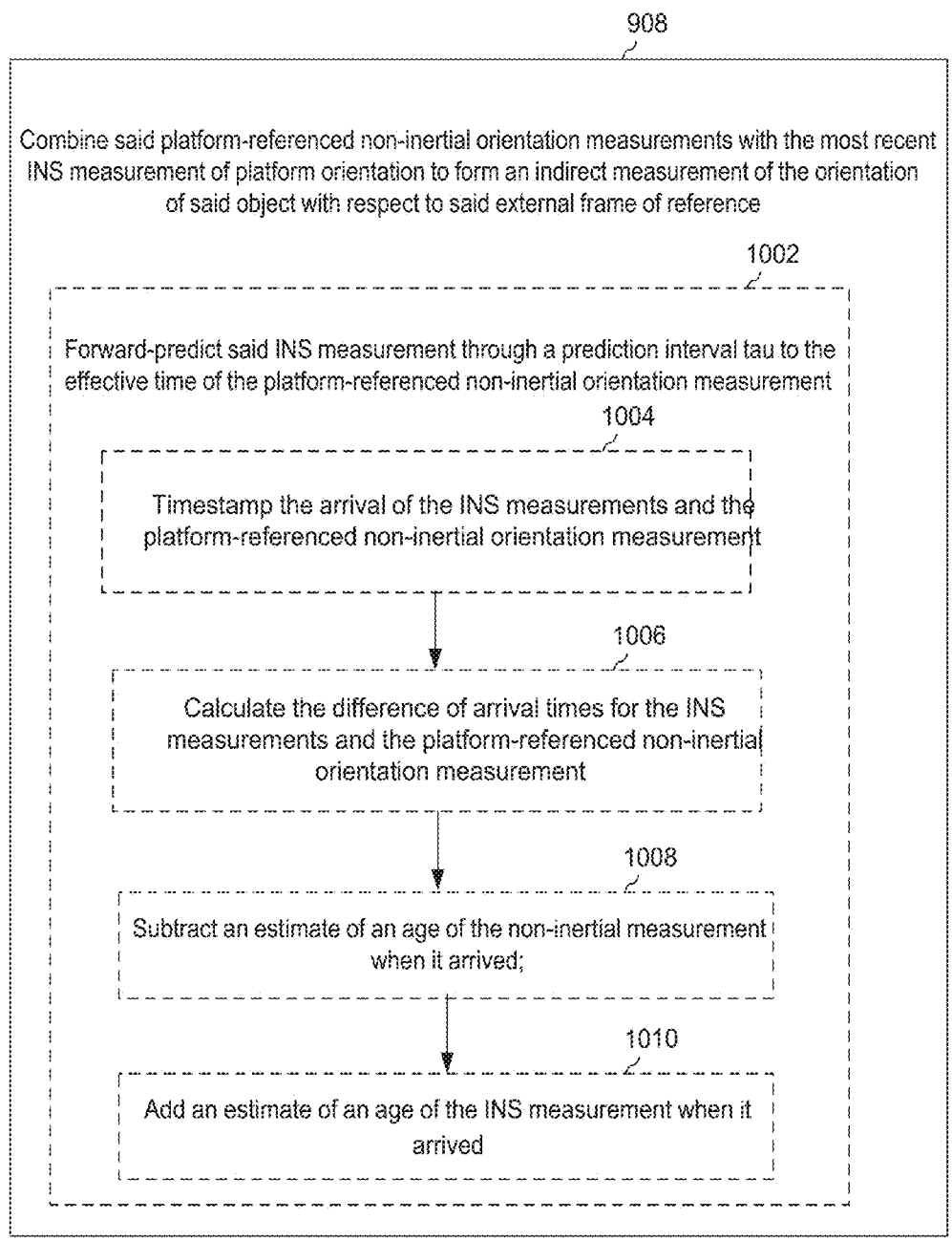
FIG. 10 is a flow chart of example aspects of a method of tracking an object moving relative to a moving platform, in accordance with aspects of the present invention.

At 908, said platform-referenced non-inertial orientation measurements are combined with the INS measurement, e.g., the most recent INS measurement, of platform orientation to form an indirect measurement of the orientation of said object with respect to said external frame of reference. FIG. 10 illustrates an example in which this combining at 908 may comprise forward-predicting said INS measurement through a prediction interval tau to the effective time of the platform-referenced non-inertial orientation measurement at 1002. Optional aspects are illustrated with a dashed line.

The prediction interval tau may be an estimate of the effective time of the platform-referenced non-inertial orientation measurement minus the effective time of the INS platform orientation measurement. As illustrated in FIG. 10, the estimation of tau may include timestamping the arrival of the INS measurements and the platform-referenced non-inertial orientation measurement at 1004, calculating the difference of arrival times for the INS measurements and the platform-referenced non-inertial orientation measurement at 1006, subtracting an estimate of an age of the non-inertial measurement when it arrived at 1008, and adding an estimate of an age of the INS measurement when it arrived at 1010. The estimate of the age of the INS measurement at arrival may be formed using an algorithm operating on the data during run time. The algorithm may include a Kalman filter with an added state for at least one of the prediction interval, a portion of the prediction interval, and the prediction interval error.

At 910, the indirect measurement is fused with said inertial orientation estimate of the object to form an improved estimate of object orientation relative to said external frame of reference. The fusion of the indirect measurement with said inertial orientation estimate may be performed, e.g., using a Kalman filter. For example, a state vector of such a Kalman filter may include three states representing orientation errors and a measurement model may include a measurement residual with a linear relationship to those states. For example, the measurement residual may be of the form $z \triangleq S^{-1} (\hat{C}_b^i \hat{C}_b^{i^T} - I)$. A Jacobian of the measurement residual with respect to the three orientation error states may comprise an identity matrix.

At 912, the improved estimate of object orientation relative to said external frame of reference may be combined with said INS measurement of platform orientation relative to said external frame of reference to form an estimate of relative orientation of said object with respect to said moving platform.

At least one aspect of the misalignment of the measurement reference coordinate frame relative to said platform coordinate frame may not be perfectly known prior to commencement of tracking operation. An algorithm may be used to estimate the unknown aspect of the coordinate frame misalignment concurrently during tracking. Such an algorithm may include comparing the inertial angular rates from said sensor unit, converted into the measurement reference frame, with the angular rates of the platform frame from the platform INS. The algorithm may include comparing the orientation from integration of inertial angular rates from said sensor unit, converted into the measurement reference frame, with the platform orientation from the platform INS. Such tracking may include using a Kalman filter whose state includes one of at least one aspect of the object orientation relative to said external frame of reference and at least one aspect of the error in said object orientation relative to said external frame of reference. The Kalman filter's state vector may further include at least one of said unknown aspect and aspects of said coordinate frame misalignment.

Figure 11:
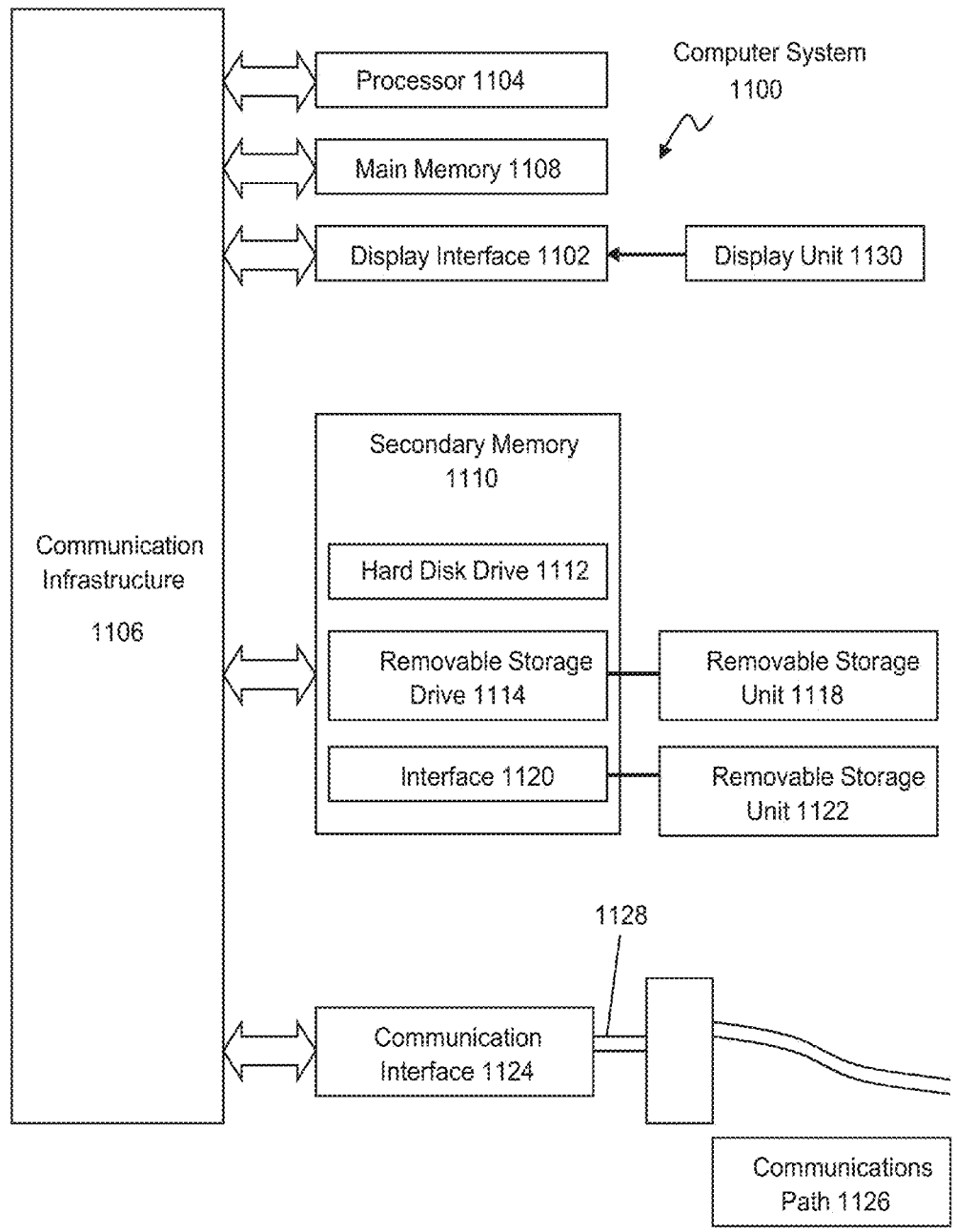
FIG. 11 presents an example system diagram of various hardware components and other features, for use in accordance with aspects of the present invention

FIG. 11 presents an example system diagram of various hardware components and other features, for use in accordance with aspects presented herein. The aspects may be implemented using hardware, software, or a combination thereof and may be implemented in one or more computer systems or other processing systems. In one example, the aspects may include one or more computer systems capable of carrying out the functionality described herein, e.g., in connection with FIGS. 9 and 10. An example of such a computer system 1100 is shown in FIG. 11.

Computer system 1100 includes one or more processors, such as processor 1104. The processor 1104 is connected to a communication infrastructure 1106 (e.g., a communications bus, cross-over bar, or network). Various software aspects are described in terms of this example computer system. After reading this description, it will become apparent to a person skilled in the relevant art(s) how to implement the aspects presented herein using other computer systems and/or architectures.

Computer system 1100 can include a display interface 1102 that forwards graphics, text, and other data from the communication infrastructure 1106 (or from a frame buffer not shown) for display on a display unit 1130. Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc., which is read by and written to removable storage drive 1114. As will be appreciated, the removable storage unit 1118 includes a computer usable storage medium having stored therein computer software and/or data.

In alternative aspects, secondary memory 1110 may include other similar devices for allowing computer programs or other instructions to be loaded into computer system 1100. Such devices may include, for example, a removable storage unit 1122 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124 are in the form of signals 1128, which may be electronic, electromagnetic, optical or other signals capable of being received by communications interface 1124. These signals 1128 are provided to communications interface 1124 via a communications path (e.g., channel) 1126. This path 1126 carries signals 1128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1180, a hard disk installed in hard disk drive 1170, and signals 1128. These computer program products provide software to the computer system 1100. Aspects presented herein may include such computer program products.

Computer programs (also referred to as computer control logic) are stored in main memory 1108 and/or secondary memory 1110. Computer programs may also be received via communications interface 1124. Such computer programs, when executed, enable the computer system 1100 to perform the features presented herein, as discussed herein. In particular, the computer programs, when executed, enable the processor 1110 to perform the features presented herein. Accordingly, such computer programs represent controllers of the computer system 1100.

In aspects implemented using software, the software may be stored in a computer program product and loaded into computer system 1100 using removable storage drive 1114, hard drive 1112, or communications interface 1120. The control logic (software), when executed by the processor 1104, causes the processor 1104 to perform the functions as described herein. In another example, aspects may be implemented primarily in hardware using, for example, hardware components, such as application specific integrated circuits (ASICs). Implementation of the hardware state machine so as to perform the functions described herein will be apparent to persons skilled in the relevant art(s).

In yet another example, aspects presented herein may be implemented using a combination of both hardware and software.

Figure 12:
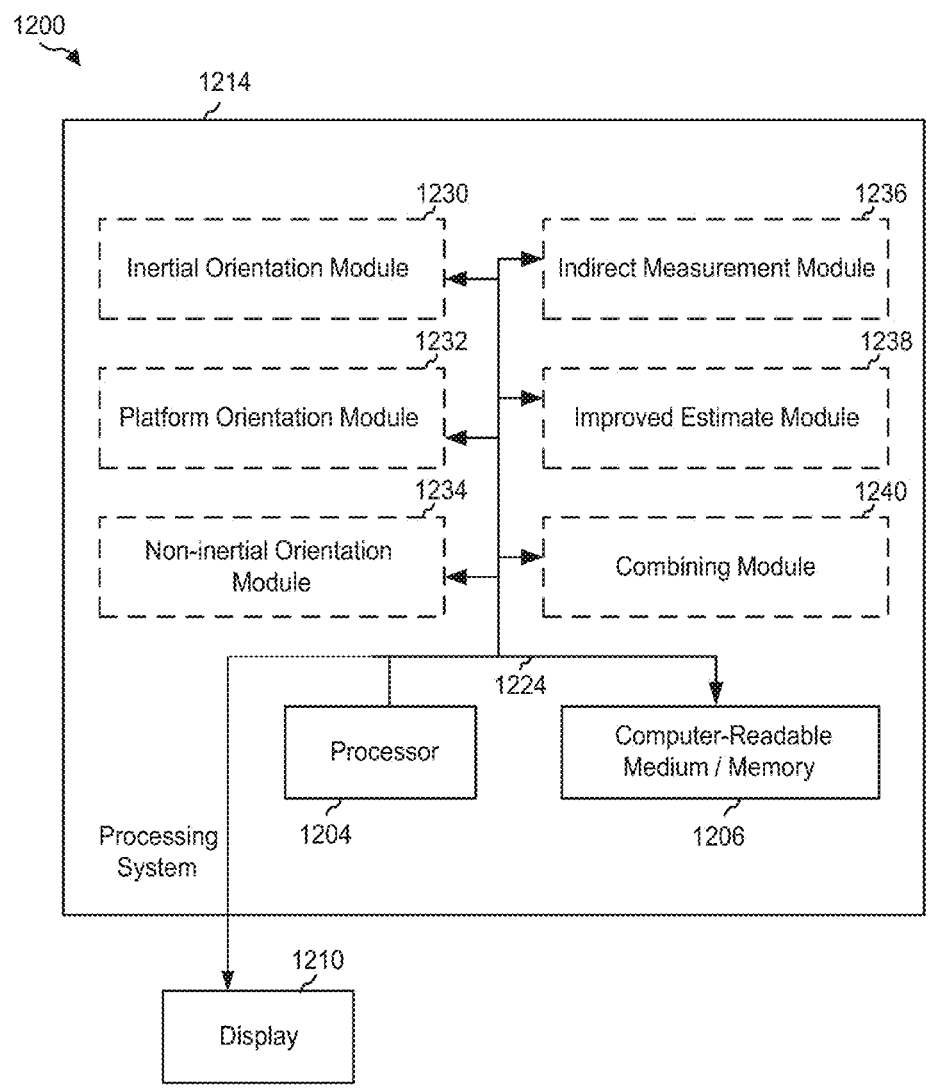
FIG. 12 is an example diagram illustrating example aspects of a hardware implementation for an apparatus employing a processing system in accordance with aspects of the present invention.

FIG. 12 is a diagram illustrating an example of a hardware implementation for an apparatus 1200 employing a processing system 1214. The processing system 1214 may be implemented with an architecture that links together various circuits including one or more processors and/or modules, represented by the processor 1204, the modules 1230, 1232, 1234, 1236, 1238, and 1240, and the computer-readable medium/memory 1206.

The processing system 1214 may be coupled to a display, such as HMD 102 in FIG. 1. The processing system may also be coupled to various sensors, such as tracking sensor 302, INS 108, mission computer 106, control unit and image generator 104, etc. Inertial Orientation module 1230 may be configured to update an inertial orientation estimate of the object relative to the external frame of reference using at least one angular rate sensor comprised in a sensor unit fixed to the object. Platform orientation module 1232 may be configured to obtain measurements from a platform-mounted INS of the orientation of a platform coordinate frame with respect to said external frame of reference.

Non-inertial Orientation module 1234 may be configured to obtain measurements from a non-inertial sensor of the orientation of the sensor unit relative to a measurement reference coordinate frame fixed with respect to the platform.

Improved estimate module 1238 may be configured to combine said platform-referenced non-inertial orientation measurements with the most recent INS measurement of platform orientation to form an indirect measurement of the orientation of said object with respect to said external frame of reference and to fuse said indirect measurement with said inertial orientation estimate of the object to form an improved estimate of object orientation relative to said external frame of reference.

In certain aspects, apparatus 1200 may include a combining module configured to combine the improved estimate of object orientation relative to said external frame of reference with said INS measurement of platform orientation relative to said external frame of reference to form an estimate of relative orientation of said object with respect to said moving platform.

The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1230, 1232, 1234, 1236, 1238, and 1240. The modules may be software modules running in the processor 1204, resident/stored in the computer readable medium/memory 1206, one or more hardware modules coupled to the processor 1204, or some combination thereof The processing system 1214 may be a component of a vehicular augmented reality system, as illustrated in FIG. 1.

In one configuration, the apparatus 1200 for tracking an object moving relative to a moving platform, the moving platform moving relative to an external frame of reference includes means for updating an inertial orientation estimate of the object relative to the external frame of reference using at least one angular rate sensor comprised in a sensor unit fixed to the object and means for obtaining measurements from a platform-mounted inertial navigation system (INS) of the orientation of a platform coordinate frame with respect to said external frame of reference. The apparatus may further include means for obtaining measurements from a non-inertial sensor of the orientation of the sensor unit relative to a measurement reference coordinate frame fixed with respect to the platform, combining said platform-referenced non-inertial orientation measurements with the most recent INS measurement of platform orientation to form an indirect measurement of the orientation of said object with respect to said external frame of reference, and fusing said indirect measurement with said inertial orientation estimate of the object to form an improved estimate of object orientation relative to said external frame of reference. The aforementioned means may be one or more of the aforementioned modules of the apparatus 1200 and/or the processing system 1214 of the apparatus 1200 configured to perform the functions recited by the aforementioned means.

Thus, aspects may include an apparatus for tracking an object moving relative to a moving platform, the moving platform moving relative to an external frame of reference and including a memory and at least one processor coupled to the memory and configured to perform the aspects described, e.g., in connection with FIGS. 9 and 10.

The apparatus may include additional modules that perform each of the blocks of the algorithm in the aforementioned flowcharts of FIGS. 9 and 10. As such, each block in the aforementioned flowcharts of FIGS. 9 and 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Thus, aspects may include a computer program product for tracking an object moving relative to a moving platform, the moving platform moving relative to an external frame of reference, the computer program product comprising a computer usable medium having control logic stored therein for causing a computer to perform the aspects described in connection with, e.g., FIGS. 9 and 10.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the invention. Therefore, the invention is intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for tracking an object moving relative to a moving platform, the moving platform moving relative to an external frame of reference, the method comprising:

updating an inertial orientation estimate of the object relative to the external frame of reference using at least one angular rate sensor comprised in a sensor unit fixed to the object;

obtaining, from an inertial navigation system (INS) mounted to the moving platform, measurements of the orientation of a platform coordinate frame with respect to said external frame of reference;

at certain measurement times, obtaining measurements from a non-inertial sensor of the orientation of the sensor unit relative to a measurement reference coordinate frame fixed with respect to the moving platform, combining said platform-referenced non-inertial orientation measurements with the INS measurement of platform orientation to form an indirect measurement of the orientation of said object with respect to said external frame of reference, and fusing said indirect measurement with said inertial orientation estimate of the object to form an improved estimate of object orientation relative to said external frame of reference; and combining said improved estimate of object orientation relative to said external frame of reference with said INS measurement of platform orientation relative to said external frame of reference to form an estimate of relative orientation of said object with respect to said moving platform.

2. The method of claim 1, wherein the external frame of reference is an external world frame that does not rotate with said moving platform.

3. The method of claim 1, wherein the measurements are obtained from the INS mounted to the moving platform at a lower rate than the sensor unit fixed to the object.

4. The method of claim 1, wherein said fusion of said indirect measurement with said inertial orientation estimate is performed using a Kalman filter.

5. The method of claim 4, wherein a state vector of said Kalman filter includes three states representing orientation errors and a measurement model includes a measurement residual with a linear relationship to those states.

6. The method of claim 5, wherein the measurement residual is of the form $$z \triangleq S^{-1}\left(\tilde{C}_b^j \hat{C}_b^{j^T} - I\right).$$

7. The method of claim 5, wherein a Jacobian of the measurement residual with respect to the three orientation error states comprises an identity matrix.

8. The method of claim 1, wherein combining said platform-referenced non-inertial orientation measurements with the INS measurement of platform orientation further comprises:

forward-predicting said INS measurement through a prediction interval tau to the effective time of the platform-referenced non-inertial orientation measurement.

9. The method of claim 8, wherein the prediction interval tau is an estimate of the effective time of the platform-referenced non-inertial orientation measurement minus the effective time of the INS measurement of platform orientation.

10. The method of claim 9, wherein the estimation of tau includes:
 timestamping the arrival of the INS measurements and the platform-referenced non-inertial orientation measurement;
 calculating the difference of arrival times for the INS measurements and the platform-referenced non-inertial orientation measurement;
 subtracting an estimate of an age of the platform-referenced non-inertial orientation measurement when it arrived; and
 adding an estimate of an age of the INS measurement when it arrived.

11. The method of claim 10, wherein the estimate of the age of the INS measurement at arrival is formed using an algorithm operating on the data during run time.

12. The method of claim 11, wherein said algorithm includes a Kalman filter with an added state for at least one of the prediction interval, a portion of the prediction interval, and the prediction interval error.

13. The method of claim 1, wherein at least one aspect of a misalignment of said measurement reference coordinate frame relative to said platform coordinate frame is not known prior to commencement of tracking operation.

14. The method of claim 13, further comprising:
 using an algorithm to estimate said unknown aspect of the coordinate frame misalignment concurrently during tracking.

15. The method of claim 14, wherein said algorithm comprises:
 comparing inertial angular rates from said sensor unit, converted into the measurement reference frame, with angular rates of the platform orientation frame from the INS mounted to the moving platform.

16. The method of claim 14, wherein said algorithm comprises:
 comparing object orientation from integration of inertial angular rates from said sensor unit, converted into the measurement reference frame, with the platform orientation from the INS mounted to the moving platform.

17. The method of claim 14, wherein said tracking comprises using a Kalman filter whose states include one of:
 at least one aspect of object orientation relative to said external frame of reference, and
 at least one aspect of an error in said object orientation relative to said external frame of reference.

18. The method of claim 17, wherein said states of said Kalman filter further includes at least one of said unknown aspect and aspects of said coordinate frame misalignment.

19. A system for tracking an object moving relative to a moving platform, the moving platform moving relative to an external frame of reference, comprising:
 means for updating an inertial orientation estimate of the object relative to the external frame of reference using at least one angular rate sensor comprised in a sensor unit fixed to the object;
 means for obtaining, from an inertial navigation system (INS) mounted to the moving platform, measurements of the orientation of a platform coordinate frame with respect to said external frame of reference;
 means for obtaining measurements from a non-inertial sensor of the orientation of the sensor unit relative to a measurement reference coordinate frame fixed with respect to the moving platform;
 means for combining said platform-referenced non-inertial orientation measurements with the most recent INS measurement of platform orientation to form an indirect measurement of the orientation of said object with respect to said external frame of reference and fusing said indirect measurement with said inertial orientation estimate of the object to form an improved estimate of object orientation relative to said external frame of reference; and
 means for combining said improved estimate of object orientation relative to said external frame of reference with said INS measurement of platform orientation relative to said external frame of reference to form an estimate of relative orientation of said object with respect to said moving platform.

20. The system of claim 19, wherein the means for combining said platform-referenced non-inertial orientation measurements with the most recent INS measurement of platform orientation forward-predicts said INS measurement through a prediction interval tau to the effective time of the platform-referenced non-inertial orientation measurement.

21. The system of claim 19, wherein at least one aspect of a misalignment of said measurement reference coordinate frame relative to said platform coordinate frame is unknown prior to commencement of tracking operation, the system further comprising means for using an algorithm to estimate said unknown aspect of the coordinate frame misalignment concurrently during tracking.

22. An apparatus for tracking an object moving relative to a moving platform, the moving platform moving relative to an external frame of reference, comprising:
 a memory; and
 at least one processor coupled to the memory and configured to:
  update an inertial orientation estimate of the object relative to the external frame of reference using at least one angular rate sensor comprised in a sensor unit fixed to the object;
  obtain measurements from an inertial navigation system (INS) mounted to the moving platform of the orientation of a platform coordinate frame with respect to said external frame of reference;
  obtain measurements from a non-inertial sensor of the orientation of the sensor unit relative to a measurement reference coordinate frame fixed with respect to the moving platform, combine said platform-referenced non-inertial orientation measurements with the most recent INS measurement of platform orientation to form an indirect measurement of the orientation of said object with respect to said external frame of reference, and fuse said indirect measurement with said inertial orientation estimate of the object to form an improved estimate of object orientation relative to said external frame of reference; and
  combine said improved estimate of object orientation relative to said external frame of reference with said INS measurement of platform orientation relative to said external frame of reference to form an estimate of relative orientation of said object with respect to said moving platform.

23. The apparatus of claim 22, wherein the processor is further configured to forward-predict said INS measurement through a prediction interval tau to the effective time of the platform-referenced non-inertial orientation measurement.

24. The apparatus of claim 22, wherein at least one aspect of the misalignment of said measurement reference coordinate frame relative to said platform coordinate frame is unknown prior to commencement of tracking operation, the processor further configured to use an algorithm to estimate said unknown aspect of the coordinate frame misalignment concurrently during tracking.

25. A computer program product for tracking an object moving relative to a moving platform, the moving platform moving relative to an external frame of reference, the computer program product comprising a computer usable medium having control logic stored therein for causing a computer to:
update an inertial orientation estimate of the object relative to the external frame of reference using at least one angular rate sensor comprised in a sensor unit fixed to the object;
obtain measurements from an inertial navigation system (INS) mounted to the moving platform of the orientation of a platform coordinate frame with respect to said external frame of reference;
obtain measurements from a non-inertial sensor of the orientation of the sensor unit relative to a measurement reference coordinate frame fixed with respect to the moving platform, combine said platform-referenced non-inertial orientation measurements with the most recent INS measurement of platform orientation to form an indirect measurement of the orientation of said object with respect to said external frame of reference, and fuse said indirect measurement with said inertial orientation estimate of the object to form an improved estimate of object orientation relative to said external frame of reference; and
combine said improved estimate of object orientation relative to said external frame of reference with said INS measurement of platform orientation relative to said external frame of reference to form an estimate of relative orientation of said object with respect to said moving platform.

26. The computer program product of claim 25, further comprising code for causing a computer to forward-predict said INS measurement through a prediction interval tau to the effective time of the platform-referenced non-inertial orientation measurement.

27. The computer program product of claim 25, wherein at least one aspect of the misalignment of said measurement reference coordinate frame relative to said platform coordinate frame is unknown prior to commencement of tracking operation, the computer program product further comprising code for causing a computer to use an algorithm to estimate said unknown aspect of the coordinate frame misalignment concurrently during tracking.

* * * * *